May 11, 1954
R. K. SHEWMON
2,678,416
MOTOR CONTROL
Filed Feb. 1, 1951
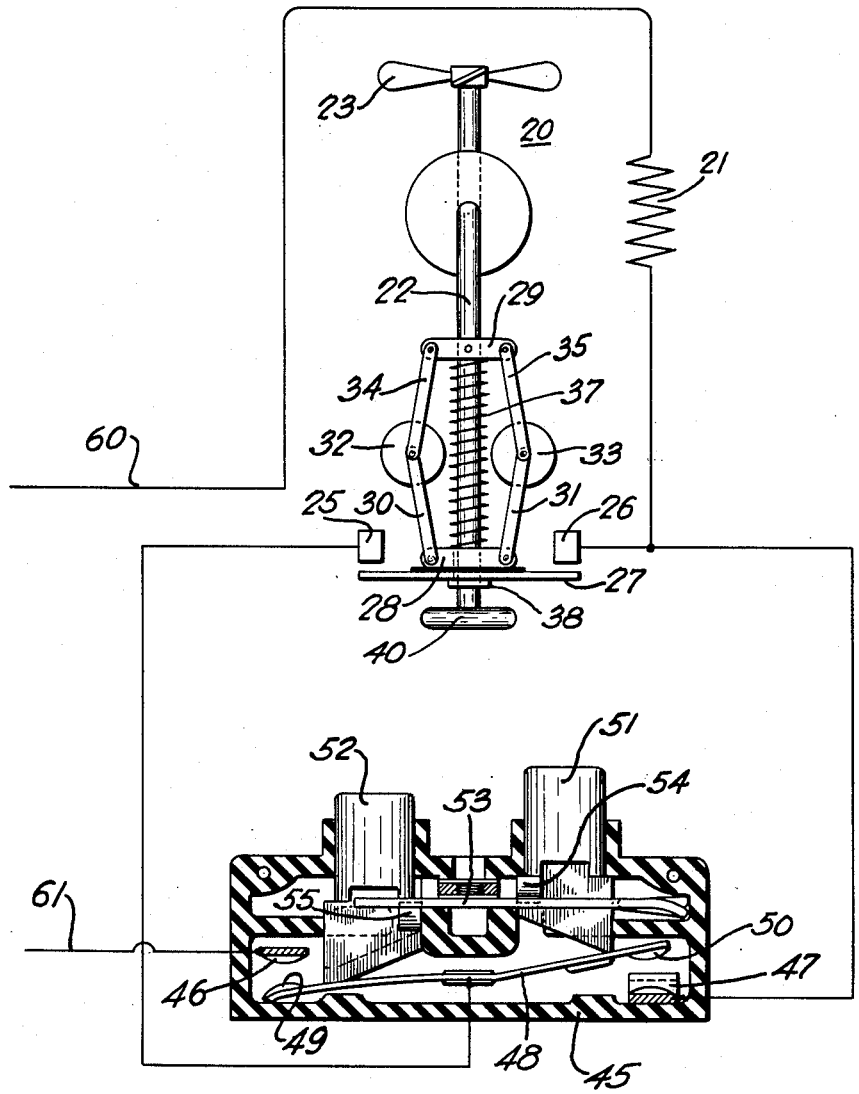
INVENTOR.
RALPH K. SHEWMON
BY
HIS　　　　　　　　　ATTORNEYS Patented May 11, 1954

2,678,416

UNITED STATES PATENT OFFICE 2,678,416

MOTOR CONTROL

Ralph K. Shewmon, Dayton, Ohio, assignor to General Motors Corporation, Detroit, Mich., a corporation of Delaware Application February 1, 1951, Serial No. 208,928

4 Claims. (Cl. 318—446)

This invention relates to a control mechanism for an electric motor incapable of self-starting but requiring a starting torque provided by means extraneous of the motor.

It is among the objects of the present invention to provide such an electric motor with a motor controlled and a manually operative control device, the latter, while it is being manually operated, concurrently completes a circuit from the power source to the single, running winding of the electric motor, to effect its energization independently of the motor controlled device, preparatory to the application of the starting torque and also connects said power source with the motor controlled device, which, in response to the motor being operated by said starting torque and then becoming self operative, becomes effective to connect the source of power with the motor winding to maintain motor operation as long as said motor operates at a predetermined speed, at which time continued manual operation of the control device is unnecessary.

A further object of the present invention is to utilize said manually operative device for stopping the operation of the motor. For this purpose, the device is provided with a member manually operative and retained in position to discontinue the circuit to the motor controlled device, release of this retained member again to establish said circuit being effected by the temporary manual operation of the device to complete the motor circuit preparatory to starting.

Further objects and advantages of the present invention will be apparent from the following description, reference being had to the accompanying drawing wherein a preferred embodiment of the present invention is clearly shown.

In the drawing:

Referring to the drawing which diagrammatically illustrates the electric motor and its motor controlled and manually operative control devices, the numeral 20 designates the electric motor as a whole. A single running winding 21 is provided in this motor, said winding being adapted to maintain motor operation, but not being able to start the motor when the winding is energized, so that a starting torque by some means extraneous of the motor must be applied to the shaft 22 of the motor before the said winding 21 is effective to maintain its operation. This electric motor is capable of operation in either direction and therefore is particularly adapted to drive a cooling fan 23 shown secured to shaft 22.

Any suitable motor controlled circuit make and break device may be provided in this motor, the present drawing indicates this device in the form of a centrifugal switch. This centrifugal switch has two stationary contacts 25 and 26 adapted to be bridged and connected together by the movable contact member 27. This contact member 27 is insulatingly attached to a yoke 28, slidably supported upon the shaft. Another similar yoke 29 is secured to the shaft in spaced relation to yoke 28 and rotates with the shaft. Levers 30 and 31 are hingedly secured to the yoke 28 and respectively to two centrifugal weights 32 and 33. Weight 32 is also connected with the yoke 29 by a lever 34, a similar lever 35 securing the centrifugal weight 23 to the yoke 29. A spring 37 is interposed between the two yokes 28 and 29 and normally, yieldably maintains yoke 28 in engagement with an abutment collar 38 secured to shaft 29 thereby drawing the centrifugal weights 22 and 23 inwardly in juxtaposition to the shaft 22 and holding the bridging contact 27 out of engagement with the stationary contacts 25 and 26.

Any means extraneous of the electric motor may be used initially to turn the motor so the energized running winding 21 thereof may become effective to continue or maintain operation of the electric motor. In this instance a hand wheel 40 is secured to the end of the shaft opposite the fan 23, said hand wheel being adapted to be turned by the operator to apply the initial starting torque to the motor shaft 22.

The manually operative control device is in the form of a unitary housing 45 supporting two stationary contacts 46 and 47. A resilient contact carrying arm 48 is supported within the housing 45, the contact 49 on said resilient arm being yieldably maintained normally engaged with contact 46, while the contact 50 at the opposite end of arm 48 is yieldably maintained normally out of engagement with the stationary contact 47. Two manually operated actuators or push buttons 51 and 52 are provided in the switch, the actuator 51 engaging the resilient bridging contact member 48 adjacent its contact 50 while the actuator 52 is engaged by the said resilient bridging contact adjacent its contact 49. A detent in the form of a hairpin spring 53 is engaged by both actuators 51 and 52, the actuator 51 having camming elements 54 which, when the actuator 51 is moved to cause contact 50 to engage contact 47, operates the detent spring 53 so that it will disengage the actuator 52 which also has camming lugs 55 engaged by the detent 53 when actuator 52 is depressed or actuated so as to retain said actuator in its contact breaking position as shown in the drawing. Thus when actuator 52 is manually operated to separate contacts 46 and 49, this actuator is locked and retained in this circuit breaking position by the detent 53. When the actuator 51 is manually operated it moves contact 50 into engagement with contact 47 and at the same time adjusts the detent spring 53 to release actuator 52 concurrently to cause engagement of contact 49 with contact 46. Contact 50 engages contact 47 only as long as the actuator 51 is manually operated and when the manual force to depress the actuator or push button 51 is removed it returns to the position as shown in the drawing and therefore permits the resilient arm, carrying contact 50, to return to normal position in which the contact 50 is disengaged from the contact 47. This particular manual control device is fully described and claimed in the application S. N. 138,314, filed January 13, 1950, C. J. Werner on Motor Control.

The accompanying drawing shows the single running winding 21 of the electric motor connected to the stationary terminal 26 of the motor control switch. It is also connected to the stationary terminal 47 of the manually operative control device. The other stationary terminal 25 of the motor control switch is connected with the resilient contact carrying arm 48 of the manually operative control device. One end of the field winding 21 is also connected to the line 60 forming one side of the source of electrical power, the other line 61 of said source being connected to the stationary terminal 46 of the manually operative control device.

In the combination just described and illustrated in the drawing, to start the motor the operator first manually operates or depresses the actuator or button 51 to cause contact 50 to be moved into engagement with the stationary contact 47 and at the same time to release the actuator 52 so that the contact 49 may move into engagement with the contact 46. During this manipulation or depression of the actuator 51 to effect concurrent closing of the contacts 47—50 and 46—49, current may flow from the line 60 through the winding 21 across terminals 47—50 through the resilient contact carrying arm 48 across contacts 49—46 to the opposite line 61 of the source of electric power. This will cause energization of the running field winding 21 of the electric motor 20, but as has been stated before, energization of this field winding 21 will not effect rotation of the electric motor 20 unless some starting torque extraneous of the motor is applied to the shaft 22. After the running winding 21 is energized, the operator turns the starting knob or wheel 40 on shaft 22 thereby permitting the field winding 21 to become effective to rotate the electric motor. Rotation of the electric motor shaft 22 will result in an outward thrust of the weights 32 and 33 due to centrifugal force and when the motor attains a predetermined speed, this outer movement of the centrifugal weights 32 and 33 will cause the bridging contact 27 to be moved upwardly away from the abutment collar 38 on the shaft against the effect of spring 37 to engage the stationary contacts 25 and 26 of the centrifugal switch.

As has been stated heretofore, the initial energizing circuit through the running winding 21 of the motor is established by the manually operative control device independently of the motor control device. Concurrently with the establishment of this circuit through the running winding 21 by the manually operative control device, operation of the actuator 51 to complete the circuit through the running windings 21 also connects the one side 61 of the source of power with the stationary terminal 25 of the centrifugal switch through the released contact 49 and its associated contact 46. Therefore, as soon as the stationary contacts 25 and 26 of the centrifugal control device or switch are bridged by the contact 27, the field or running winding 21 of the motor has its energizing circuit completed from the line 60 through the winding across terminals 26, 25 via the bridging contact 27 thence through the resilient contact carrying arm 48 of the manually operative control device across engaging contacts 49 and 46 to the opposite side 61 of the power source. The manual application of power to operate the actuator 51 may now be removed to permit separation of contacts 50 and 47 inasmuch as the running winding circuit is completed by the motor control switch, this circuit being maintained as long as the motor operates at a predetermined speed sufficient to hold the bridging contact 27 in bridging engagement with the contacts 25 and 26 thereof. However if for any reason such as friction in the motor, foreign elements becoming entangled with the fan 23 or power failure, the speed of the electric motor 20 falls below the predetermined value, the centrifugal switch or more particularly the weights 32 and 33 thereof will be moved toward each other by the spring 37 so as to effect a movement of the yoke 28 to urge the bridging contact 27 out of engagement with the stationary contacts 25 and 26 and therefore break the circuit through the running winding of the motor. This circuit cannot again be established until the actuator 51 of the manually operable control device is moved to cause engagement of contacts 50 and 47 to energize winding 21 preparatory to the application or torque extraneous of the motor.

To stop the motor during its operation the actuator 52 is depressed thereby separating contact 49 from contact 46, the separation being maintained inasmuch as the actuator 52 is retained and locked in this contact breaking position by the detent 53 which later is operated to release the actuator 52 during the movement of the actuator 51 to cause engagement of its contact 50 with contact 47 for starting purposes.

From the foregoing it may be seen that the present invention provides an electric motor incapable of self-starting, said electric motor having two control devices, one a motor control device and second a manually operated control device. The latter, during the time it is being manually depressed or actuated, concurrently completes a circuit from a power source to the running winding of the electric motor to effect its energization independently of the motor control device preparatory to the application of the starting torque and at the same time connects said power source with the motor control device. This device, when the motor is operating after being hand started, becomes effective to maintain motor operation while said motor is operating at a predetermined speed and also serves as a safety device completely to render the motor inoperative when its speed drops below said predetermined value.

The present drawings and description disclose the motor as having a single running winding which would cause the motor to operate at a predetermined normal speed. If it is desired to operate the motor at variable speeds, it would be within the scope of the present invention to provide a separate running winding for each speed required and also a selector switch which would be operable to connect the particular winding with the centrifugal switch so that the selected winding would come under the automatic control of said centrifugal switch during motor operation.

While the embodiment of the present invention as herein disclosed, constitutes a preferred form, it is to be understood that other forms might be adopted.

What is claimed is as follows:

1. In combination with a non-self starting electric motor having a rotor shaft initially rotated for starting by power applied thereto extraneous of the motor, said motor having only a running winding connectible to a power source, said winding when energized being adapted to maintain motor operation only after said motor has been started extraneously; a normally open centrifugal switch connected in series circuit with the motor winding and operated by the motor to close said switch, a manually operated control device including two manually operated control switches, one of said control switches being spring urged normally to closed position and the other of said control switches being spring urged to open position, a retaining member cooperating with both of said switches for retaining the said one switch open when it is manually operated into open position, and means on said other switch engageable with the retaining member for releasing the retained switch to permit it to close when the said other switch is moved manually to closed position, said control switches being connected electrically in series with each other and in series with the motor winding with said one of said control switches electrically in series with said centrifugal switch, said control device being operative to connect the motor winding to the power source independently of the centrifugal switch and to cooperate with the centrifugal switch when closed by the running motor for maintaining circuit through said motor winding and operative to break the winding circuit through the centrifugal switch whereby to stop the motor.

2. In combination, a non-self starting electric motor having only a running winding and including manually actuable means exteriorly of the motor for applying initial rotation to the motor rotor, a centrifugal switch actuated to closed position by the motor and normally open when the motor is inactive, a first control switch spring urged to open position normally and closable only while manually so retained, a second control switch spring urged to closed position and manually openable, a retaining member operably cooperating with both said control switches to retain said second control switch in open position upon such actuation of said switch and to release said second control switch from open position to closed position thereof upon closing actuation of said first control switch, said centrifugal switch being connected electrically in series with said winding, said first switch being connected electrically in series with said winding, said centrifugal switch also being electrically in parallel with said first control switch and electrically in series with said second control switch.

3. In combination, an electric motor having only a running winding, a centrifugal switch actuated by the motor and normally open when the motor is inactive, a first control switch spring urged to open position normally and closable only while manually so retained, a second control switch spring urged to closed position and manually openable, a retaining member operably cooperating with both said control switches to retain said second control switch in open position upon such actuation of said switch and to release said second control switch from open position to closed position thereof upon closing actuation of said first control switch, said centrifugal switch being connected electrically in series with said winding, said first and second control switches being connected electrically in series with each other and with said winding, said centrifugal switch also being electrically in parallel with said first control switch and electrically in series with said second control switch.

4. In combination, a non-self starting electric motor having only a running winding and including manually actuable means exteriorly of the motor for applying initial rotation to the motor rotor, a motor speed responsive switch actuated to closed position at a predetermined speed of the motor and normally open when the motor is inactive, a first control switch spring urged to open position normally and closable only while manually so retained, a second control switch spring urged to closed position and manually openable, a retaining member operably cooperating with both said control switches to retain said second control switch in open position upon such actuation of said switch and to release said second control switch from open position to closed position thereof upon closing actuation of said first control switch, said motor speed responsive switch and said first switch both being connected electrically in series with said winding, said motor speed responsive switch also being electrically in parallel with said first control switch and electrically in series with said second control switch.

References Cited in the file of this patent

UNITED STATES PATENTS

| Number | Name | Date |
|---|---|---|
| 289,197 | Weston | Nov. 27, 1883 |
| 444,640 | Otis et al. | Jan. 13, 1891 |
| 835,362 | Merrill | Nov. 6, 1906 |
| 1,350,571 | Shelton | Aug. 24, 1920 |
| 1,425,610 | Shelton | Aug. 15, 1922 |
| 1,604,467 | Stocking | Oct. 26, 1926 |
| 1,910,625 | Miller | May 23, 1933 |
| 2,250,141 | Thurston | July 22, 1941 |